(12) United States Patent  
Boren

(10) Patent No.: US 8,720,827 B2
(45) Date of Patent: May 13, 2014

(54) DUAL FUNCTION LAVATORY DOOR

(71) Applicant: Kelly L. Boren, Marysville, WA (US)

(72) Inventor: Kelly L. Boren, Marysville, WA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 13/625,872

(22) Filed: Sep. 25, 2012

(65) Prior Publication Data

US 2014/0083012 A1 Mar. 27, 2014

(51) Int. Cl.
*B64C 1/14* (2006.01)

(52) U.S. Cl.
USPC .............. 244/129.5; 244/118.5; 160/210; 160/218; 296/146.13

(58) Field of Classification Search
USPC ............ 296/146.13, 146.12, 146.1, 156–176; 160/210, 211, 220, 221, 218; 244/118.5, 118.2, 129.1, 129.4, 129.5
See application file for complete search history.

(56) References Cited

U.S. PATENT DOCUMENTS

| | | | | |
|---|---|---|---|---|
| 4,589,463 A * | 5/1986 | Ryan | ............................... | 160/88 |
| 4,672,772 A * | 6/1987 | Nakamura | .................... | 49/253 |
| 5,573,053 A * | 11/1996 | Hanemaayer | ................ | 160/206 |
| 6,079,669 A * | 6/2000 | Hanay et al. | ............... | 244/118.5 |
| 6,186,444 B1 * | 2/2001 | Steel | .......................... | 244/129.5 |
| 6,257,523 B1 * | 7/2001 | Olliges | ...................... | 244/118.5 |
| 6,615,421 B2 * | 9/2003 | Itakura | .............................. | 4/664 |
| 6,889,936 B1 * | 5/2005 | Pho et al. | ................... | 244/118.5 |
| 7,165,595 B2 * | 1/2007 | Yamamoto | ..................... | 160/97 |
| 7,222,820 B2 * | 5/2007 | Wentland et al. | .......... | 244/118.5 |
| 7,721,990 B2 * | 5/2010 | Jaeger et al. | ............ | 244/118.6 |
| 7,823,834 B2 * | 11/2010 | French et al. | .............. | 244/129.5 |
| 7,950,439 B2 * | 5/2011 | Anderson | ..................... | 160/211 |
| 7,984,875 B2 * | 7/2011 | Koehn et al. | ............... | 244/118.5 |
| 8,517,307 B2 * | 8/2013 | Saint-Jalmes et al. | ..... | 244/118.5 |
| 8,621,787 B2 * | 1/2014 | Barry et al. | ..................... | 52/79.1 |
| 2003/0066931 A1 * | 4/2003 | Ward | ......................... | 244/118.5 |
| 2004/0173327 A1 * | 9/2004 | Steel et al. | ..................... | 160/210 |
| 2004/0227034 A1 * | 11/2004 | Wentland et al. | ............ | 244/119 |
| 2005/0116098 A1 * | 6/2005 | Martens et al. | ........... | 244/118.5 |
| 2006/0169839 A1 * | 8/2006 | French et al. | .............. | 244/118.5 |
| 2007/0119548 A1 * | 5/2007 | Anderson | ..................... | 160/211 |
| 2009/0065641 A1 * | 3/2009 | Koehn et al. | ............... | 244/118.5 |
| 2010/0237193 A1 * | 9/2010 | Yoshizaki | .................. | 244/129.5 |
| 2012/0261509 A1 * | 10/2012 | Grant et al. | ................ | 244/118.5 |
| 2013/0206907 A1 * | 8/2013 | Burrows et al. | ............ | 244/118.5 |

* cited by examiner

*Primary Examiner* — Benjamin P Lee
(74) *Attorney, Agent, or Firm* — Ameh IP; Elahe Toosi; Lowell Campbell

(57) ABSTRACT

A dual function lavatory door and methods are presented. A hinged door panel comprises a doorway hinge coupled to a first side of a lavatory doorway of a lavatory. The doorway hinge positions the hinged door panel to couple to a first interior side-wall of the lavatory in a deployed position. An extendable door panel is coupled to the hinged door panel by a vertical hinge and can couple to a second side of the lavatory doorway opposite to the first side. The extendable door panel folds along the vertical hinge into an interior space of the lavatory in the deployed position. An extension panel is coupled to the extendable door panel and extends from the extendable door panel to couple to a second interior side-wall of the lavatory opposite to the first interior side-wall in the deployed position.

20 Claims, 10 Drawing Sheets

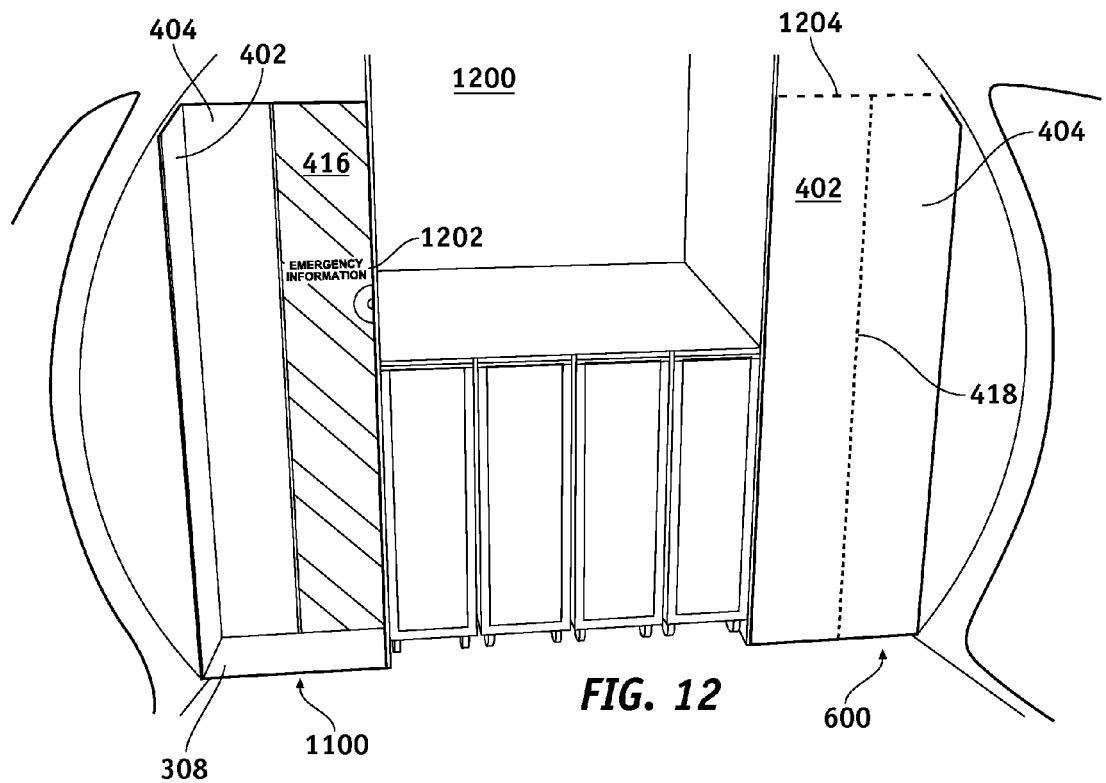
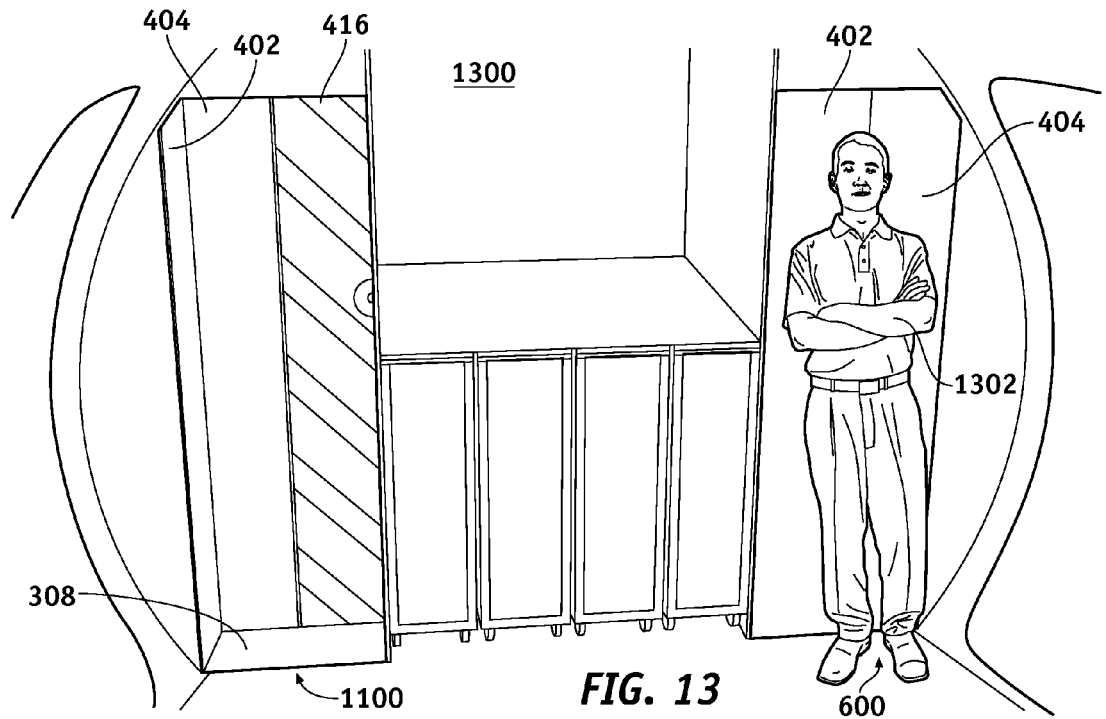

DUAL FUNCTION LAVATORY DOOR

FIELD

Embodiments of the present disclosure relate generally to lavatory door design. More particularly, embodiments of the present disclosure relate to aircraft lavatory door design.

BACKGROUND

Commercial aircraft flying regulations generally require an assistance space near exit doors to facilitate egress during an apparent emergency egress event. The assistance space near the exit doors facilitates a flight attendant assisting passengers during emergency egress. The assistance space may take enough required space to displace seat rows on an aircraft.

SUMMARY

A dual function lavatory door and methods are presented. A hinged door panel comprises a doorway hinge configured to couple to a first side of a lavatory doorway of a lavatory and to position the hinged door panel to couple to a first interior side-wall of the lavatory in a deployed position. An extendable door panel is coupled to the hinged door panel by a vertical hinge, and is configured to couple to a second side of the lavatory doorway opposite to the first side and fold along the vertical hinge into an interior space of the lavatory in the deployed position. An extension panel is coupled to the extendable door panel and extends from the extendable door panel to couple to a second interior side-wall of the lavatory opposite to the first interior side-wall in the deployed position.

Embodiments of the disclosure provide a means for a dual function lavatory door for an aircraft that allows for a secondary locking position to enable a floor space of an aircraft lavatory to act as both assist space when needed for emergency egress and lavatory floor space under normal cruise conditions. The dual function lavatory door enables a cabin layout which allows for an addition of a substantial number of economy class seats in an aircraft cabin.

In an embodiment, a dual function lavatory door comprises a hinged door panel an extendable door panel, and an extension panel. The hinged door panel comprises a doorway hinge that is configured to couple to a first side of a lavatory doorway of a lavatory and to position the hinged door panel to couple to a first interior side-wall of the lavatory in a deployed position. The extendable door panel is coupled to the hinged door panel by a vertical hinge, and couples to a second side of the lavatory doorway opposite to the first side and folds along the vertical hinge into an interior space of the lavatory in the deployed position. The extension panel is coupled to the extendable door panel and extends from the extendable door panel to couple to a second interior side-wall of the lavatory opposite to the first interior side-wall in the deployed position.

In another embodiment, a method for deploying a dual function lavatory door decouples an extendable door panel from a slide track in response to an activation mechanism. The slide track is configured to slide the extendable door panel to couple to a second side of a lavatory doorway opposite to a first side of the lavatory doorway. The method further couples a hinged door panel comprising a doorway hinge coupled to the first side of the lavatory doorway to a first interior side-wall of a lavatory in response to the activation mechanism. The method further folds the extendable door panel along a vertical hinge coupled to the hinged door panel into an interior space of the lavatory in response to the activation mechanism. The method further extends an extension panel coupled to the extendable door panel from the extendable door panel to couple to a second interior side-wall of the lavatory opposite to the first interior side-wall in response to the activation mechanism.

In a further embodiment, a method for configuring a dual function lavatory door for an aircraft lavatory couples a hinged door panel to a first side of a lavatory doorway of a lavatory via a doorway hinge. The method further configures the doorway hinge to position the hinged door panel to couple to a first interior side-wall of the lavatory in a deployed position, and couples an extendable door panel to the first door panel via a vertical hinge. The method further configures the extendable door panel to couple to a second side of the lavatory doorway opposite to the first side, and to fold along the vertical hinge into an interior space of the lavatory in the deployed position. The method further couples an extension panel to the extendable door panel, and configures the extension panel to extend from the extendable door panel to couple to a second interior side-wall of the lavatory opposite to the first interior side-wall in the deployed position.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 12 is an illustration of an exemplary front view of a dual function lavatory door in a normal cruise position and in an emergency egress position according to an embodiment of the disclosure.

FIG. 13 is an illustration of an exemplary front view of a dual function lavatory door in a normal cruise position and in an emergency egress position according to an embodiment of the disclosure showing a crew member standing at the dual function lavatory door in a normal cruise position.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft lavatory door, aircraft lavatory door operation, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
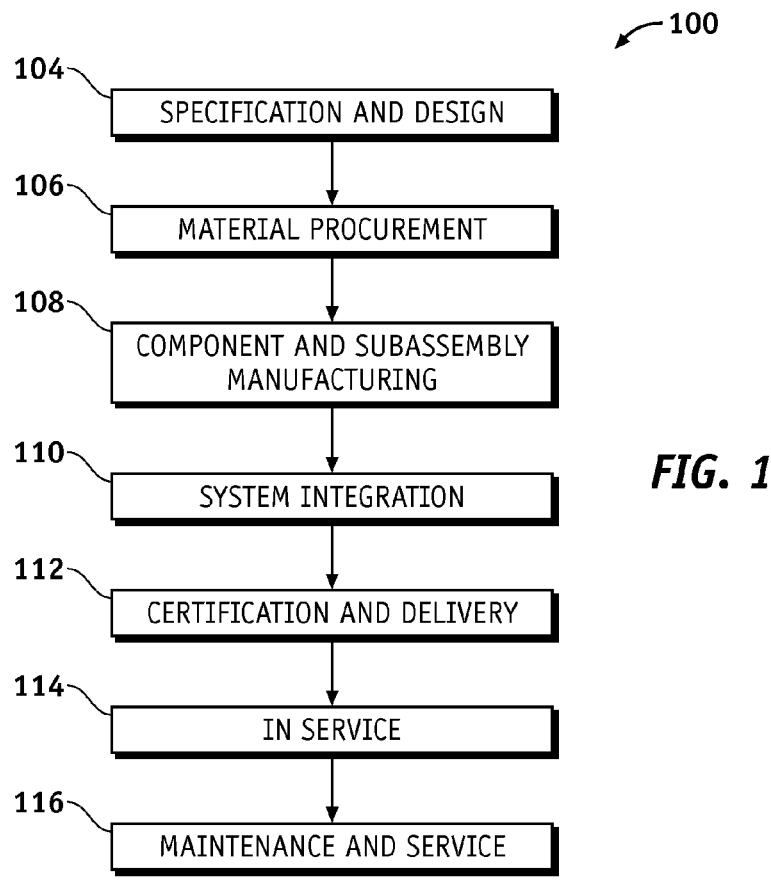
FIG. 1 is an illustration of a flow diagram of an exemplary aircraft production and service methodology.
Figure 2:
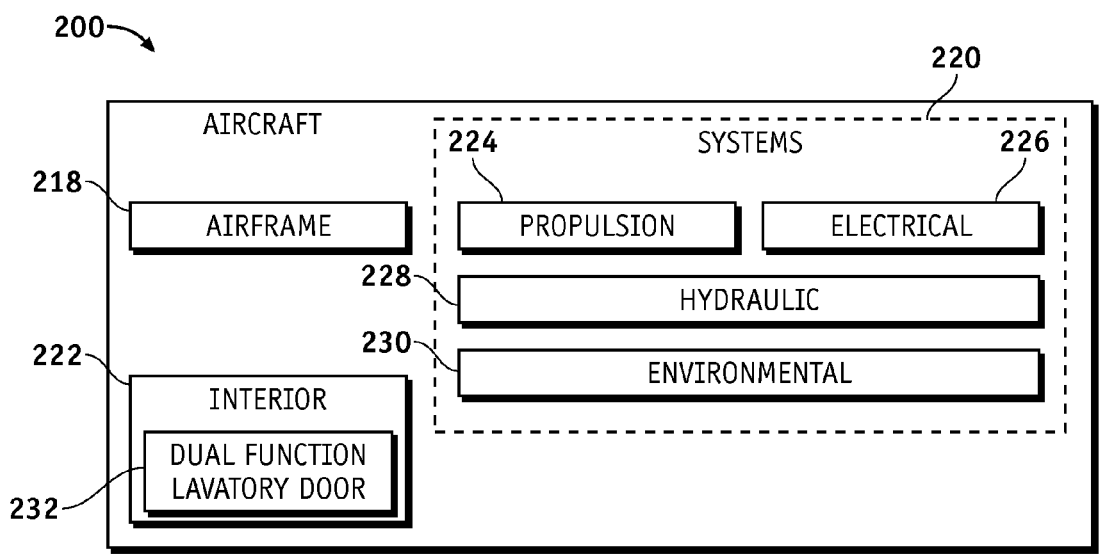
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and integration of system 110 (system integration 110) of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a dual function lavatory door 232. Any number of other systems may also be included.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
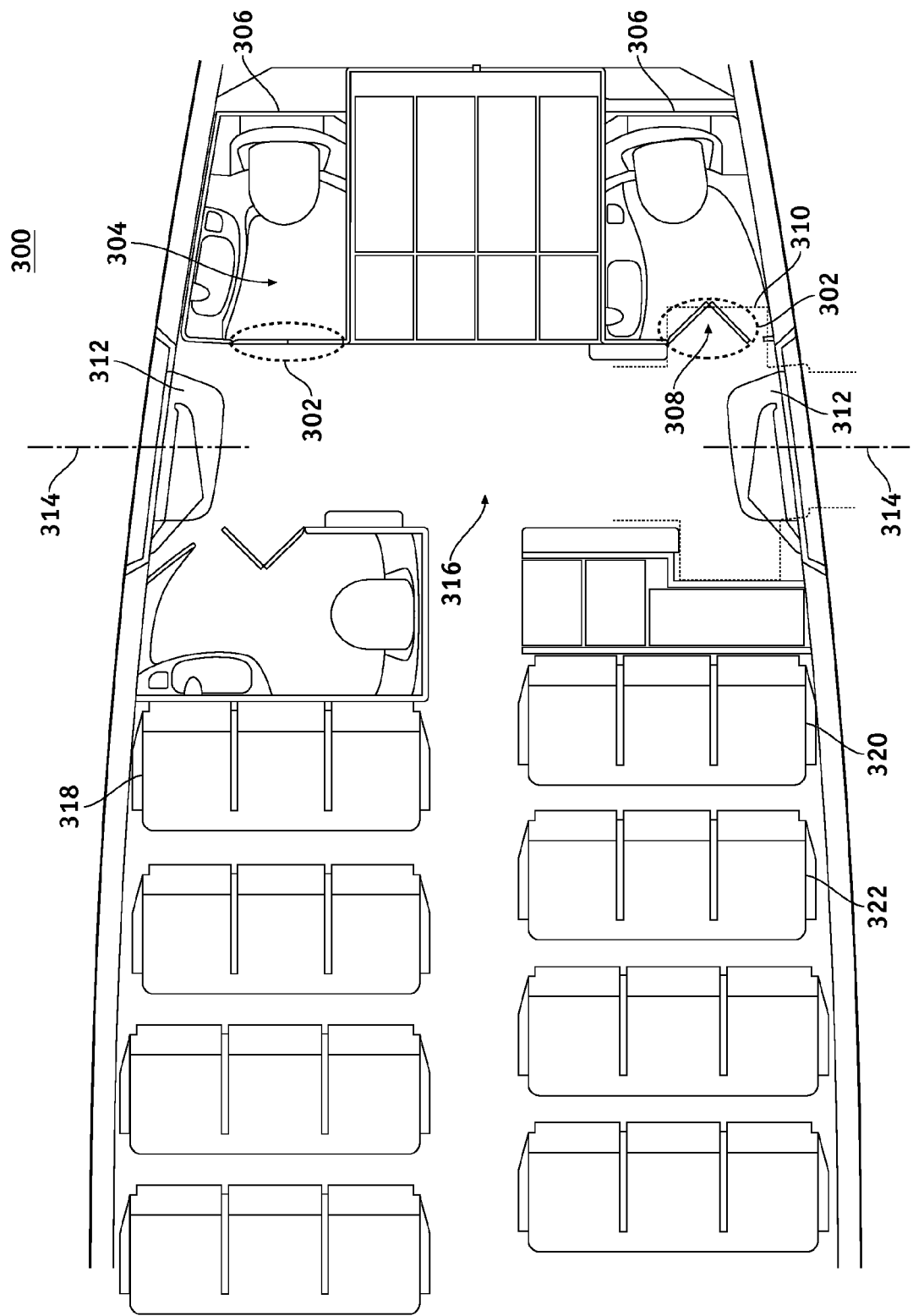
FIG. 3 is an illustration of an exemplary top view of an aircraft cabin layout showing a dual function lavatory door according to an embodiment of the disclosure.

FIG. 3 is an illustration of an exemplary top view of an aircraft cabin layout 300 showing a dual function lavatory door 302 according to an embodiment of the disclosure. The dual function lavatory door 302 allows for multiple locking positions to enable a lavatory interior floor space 304 of an aircraft lavatory 306 to act as both an egress assistance space 308 (secondary space) defined by a line 310 when needed for an emergency egress and the lavatory interior floor space 304 under normal operation conditions. The egress assistance space 308 allows a crew member 1302 (FIG. 14) to stand or be located at the egress assistance space 308 to facilitate passengers exiting through rear cabin aircraft boarding doors 312 located along a centerline 314 of a cross isle 316. In this document, lavatory interior floor space 304 and floor 304 may be used interchangeably. Also in this document, egress assistance space 308 and secondary space 308 may be used interchangeably.

In this manner, as a result of the dual function lavatory door 302 described herein, seated row capacity increases in a cabin space. For example but without limitation, the aircraft cabin layout 300 allows for addition of a substantial number of economy class seats such as 9 seats in rows 318, 320, and 322, or other number of seats suitable for a given cabin space. The addition of the substantial number of economy class seats is made possible by the dual function lavatory door 302 described herein.

Figure 4:
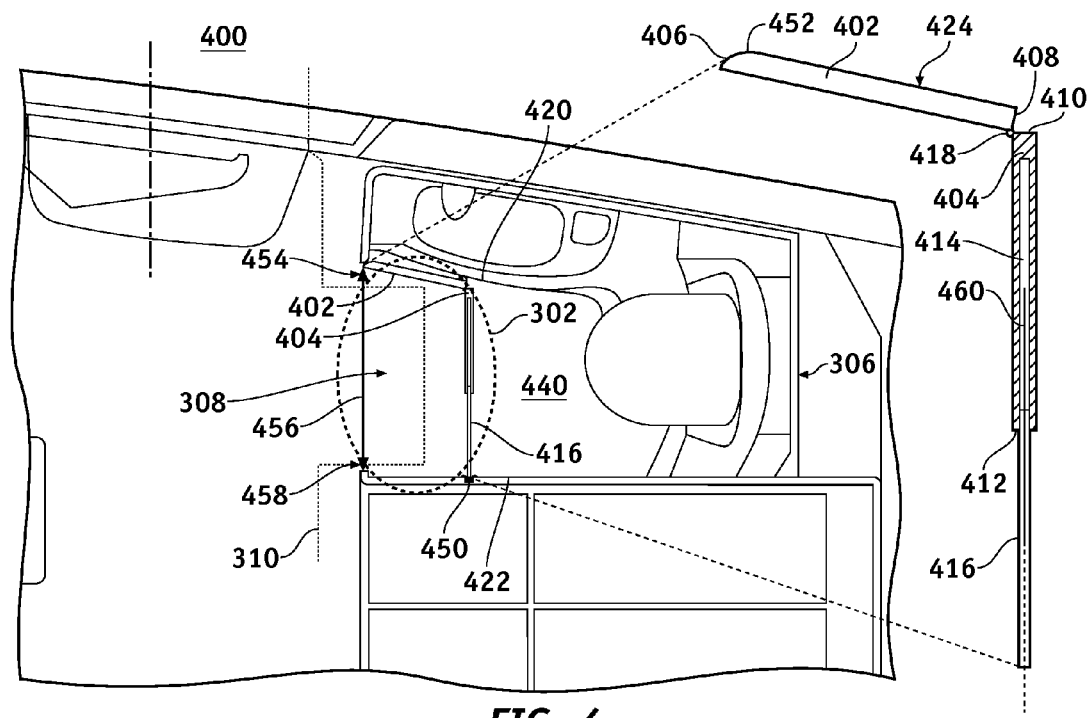
FIG. 4 is an illustration of an exemplary top view of an aircraft lavatory showing a dual function lavatory door in a deployed and locked position according to an embodiment of the disclosure.
Figure 11:
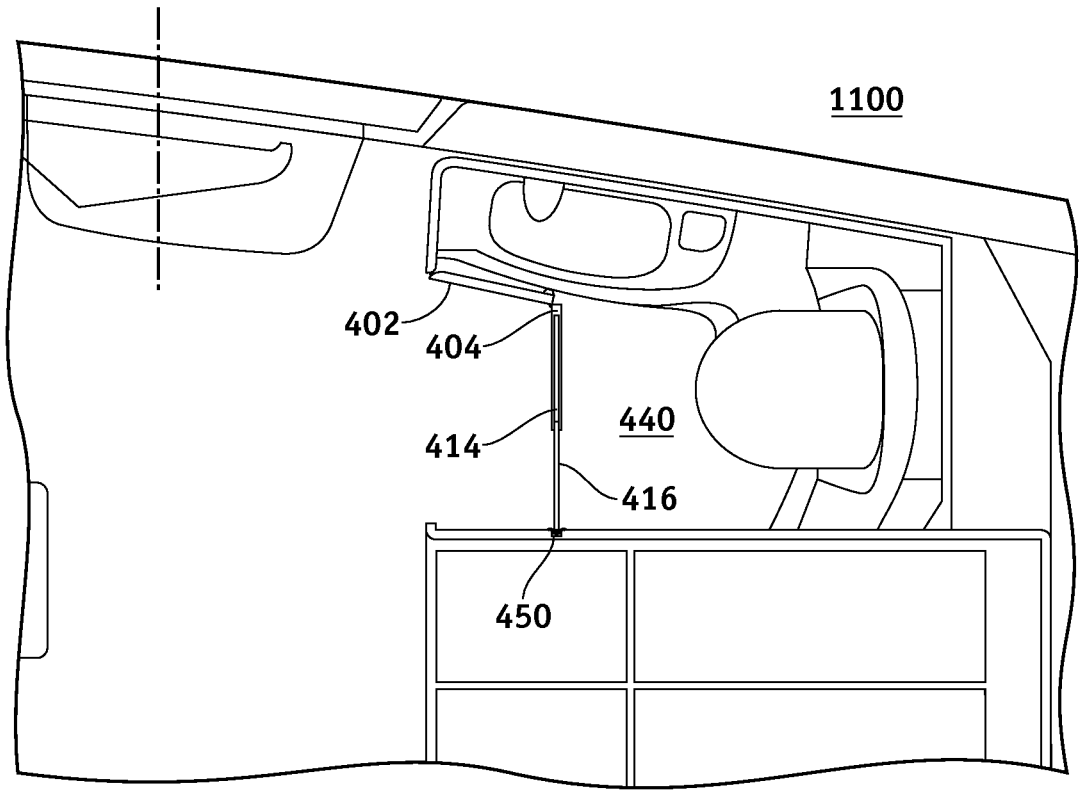

FIG. 4 is an illustration of an exemplary top view 400 of an aircraft lavatory 306 showing the dual function lavatory door 302 in a deployed and locked position (deployed position 1100, FIG. 11) according to an embodiment of the disclosure. FIG. 4 may have functions, material, and structures that are similar to the embodiments shown in FIG. 3. Therefore, common features, functions, and elements may not be redundantly described here.

The dual function lavatory door 302 comprises a hinged door panel 402 and an extendable door panel 404 coupled along a vertical hinge 418 forming bi-folding panels. The bi-folding panels may be of equal width providing equal bi-folding panels. The dual function lavatory door 302 is not limited to two folding panels and may comprise other folding panels in addition to the hinged door panel 402 and the extendable door panel 404.

The hinged door panel 402 comprises a doorway hinge 452 configured to couple to a first side 454 of a lavatory doorway 456 of the aircraft lavatory 306 and to position the hinged door panel 402 to couple to a first interior side-wall 420 of the aircraft lavatory 306 in the deployed position 1100. A side-wall hinge side 406 of the hinged door panel 402 may be coupled to the first interior side-wall 420 opposing a second interior side-wall 422 (e.g., by the doorway hinge 452). A magnetic keeper 502 (FIG. 5) may be coupled to a surface 424 of the hinged door panel 402 and may be magnetically coupled to the lavatory first interior side-wall 420 (e.g., at a sink). The magnetic keeper 502 holds the hinged door panel 402 to the lavatory first interior side-wall 420 when the dual function lavatory door 302 is in the deployed position 1100.

The extendable door panel 404 is coupled to the hinged door panel 402 at the vertical hinge 418 and is configured to couple to a second side 458 of the lavatory doorway 456 opposite to the first side 454 and to fold along the vertical hinge 418 into an interior space 440 of the aircraft lavatory 306 in the deployed position 1100 such that a secondary space 308 is defined on the floor 304 of the aircraft lavatory 306. A middle hinge side 408 of the hinged door panel 402 is coupled to a hinge side 410 of the extendable door panel 404.

An extension panel 416 is coupled to the extendable door panel 404 and is configured to extend from the extendable door panel 404 to couple to a second interior side-wall 422 of the aircraft lavatory 306 opposite to the first interior side-wall 420 in the deployed position 1100.

The extendable door panel 404 also comprises a pocket section 414, and a spring loaded plunger 460.

The pocket section 414 is located inside the extendable door panel 404.

The spring loaded plunger 460 is located inside the pocket section 414 and is configured to extend outwardly from (e.g., from an outer side 412 of) the extendable door panel 404 to lock the extendable door panel 404 onto the lavatory second side-wall 422.

A lock receiver 450 may be located on the second interior side-wall 422 to receive and lock the extension panel 416, e.g., when extended by the spring loaded plunger 460.

The hinged door panel 402, the extendable door panel 404 and the extension panel 416 define a secondary space 308 on the floor 304 of the aircraft lavatory 306.

Figure 5:
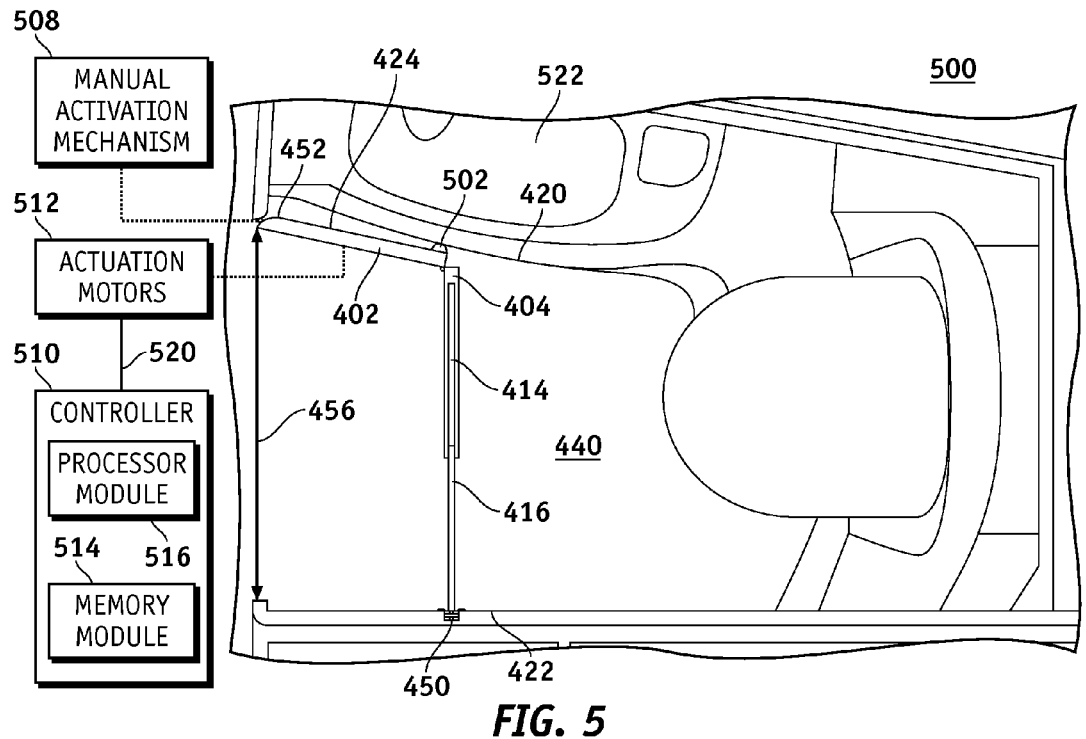
FIG. 5 is an illustration of an exemplary dual function lavatory door system according to an embodiment of the disclosure.
Figure 6:
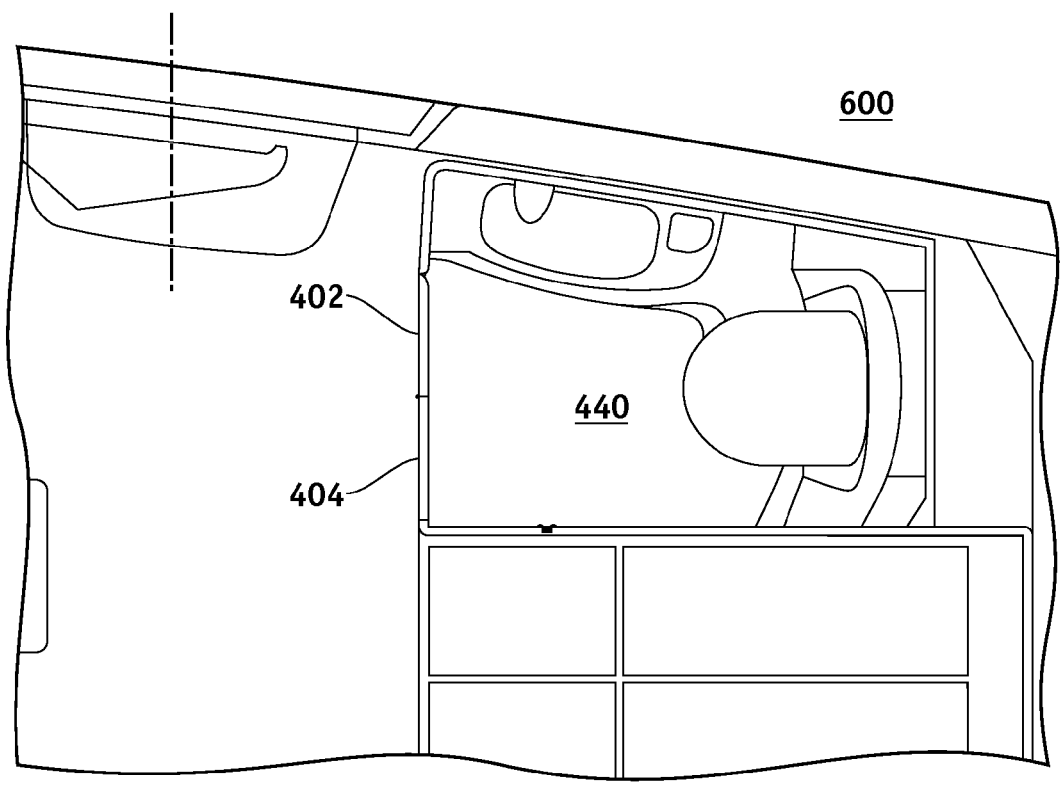
FIGS. 6-11 are illustrations of top views of an exemplary dual function lavatory door showing a deployment sequence of the dual function lavatory door starting from a normal cruise position, changing to intermediate positions, and ending in an emergency egress position according to an embodiment of the disclosure.
Figure 7:
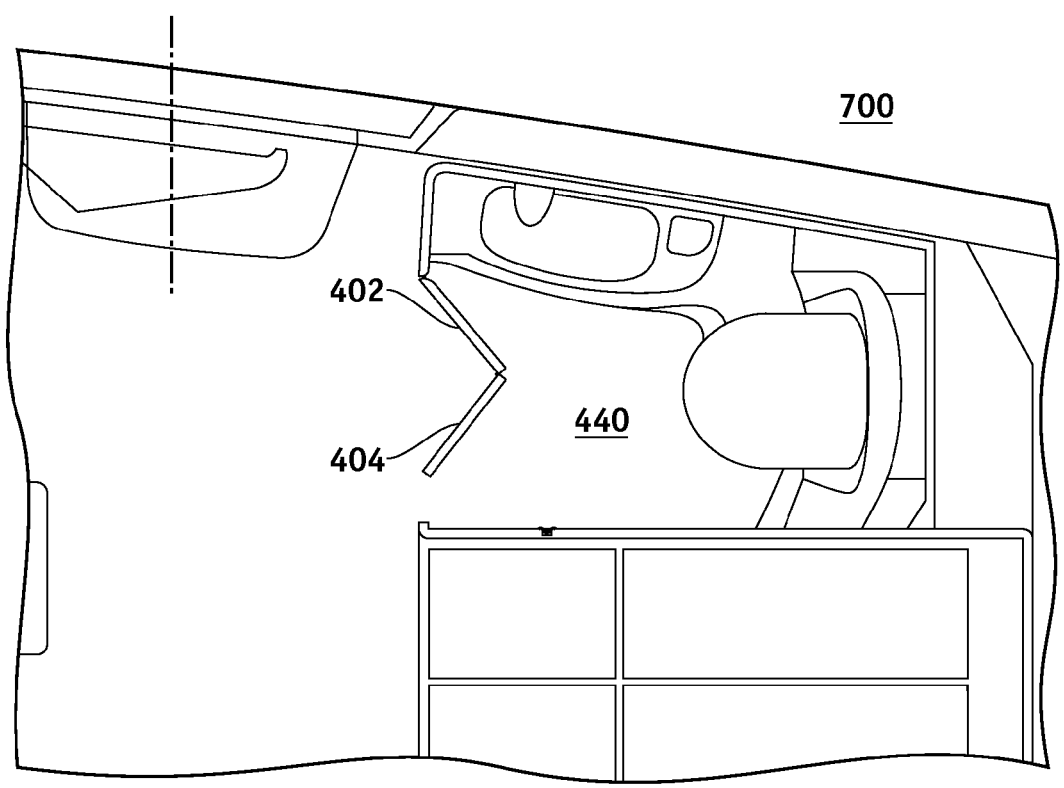
Figure 8:
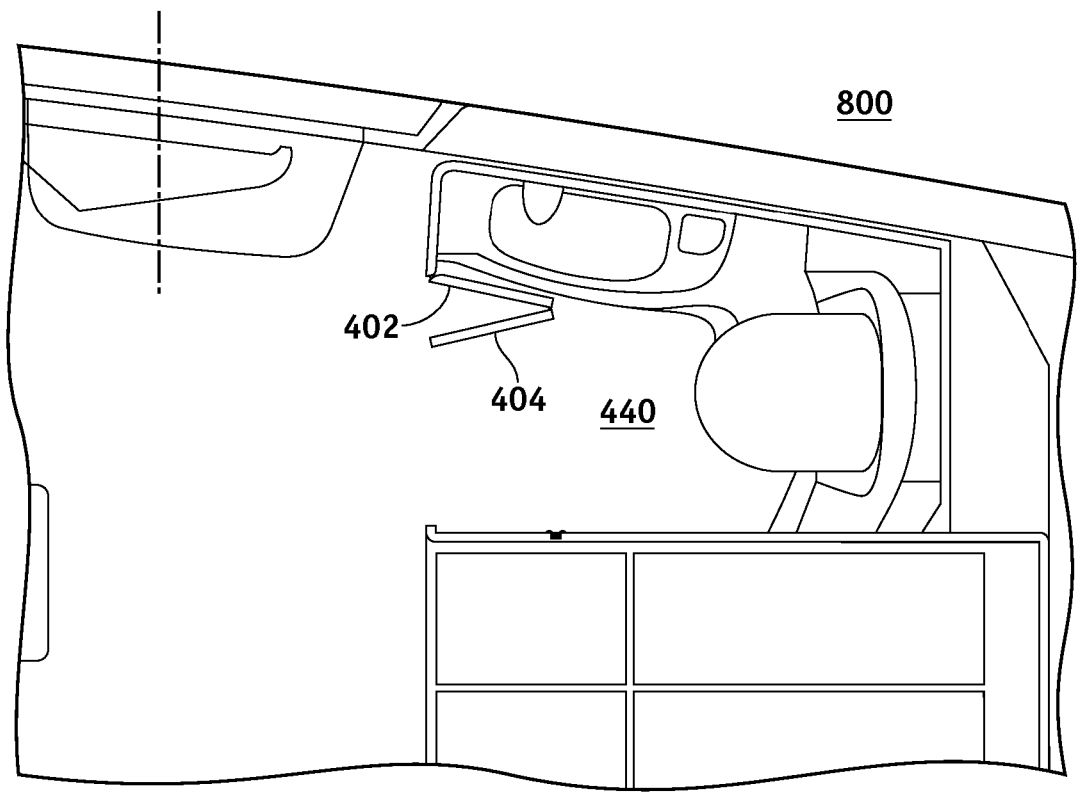
Figure 9:
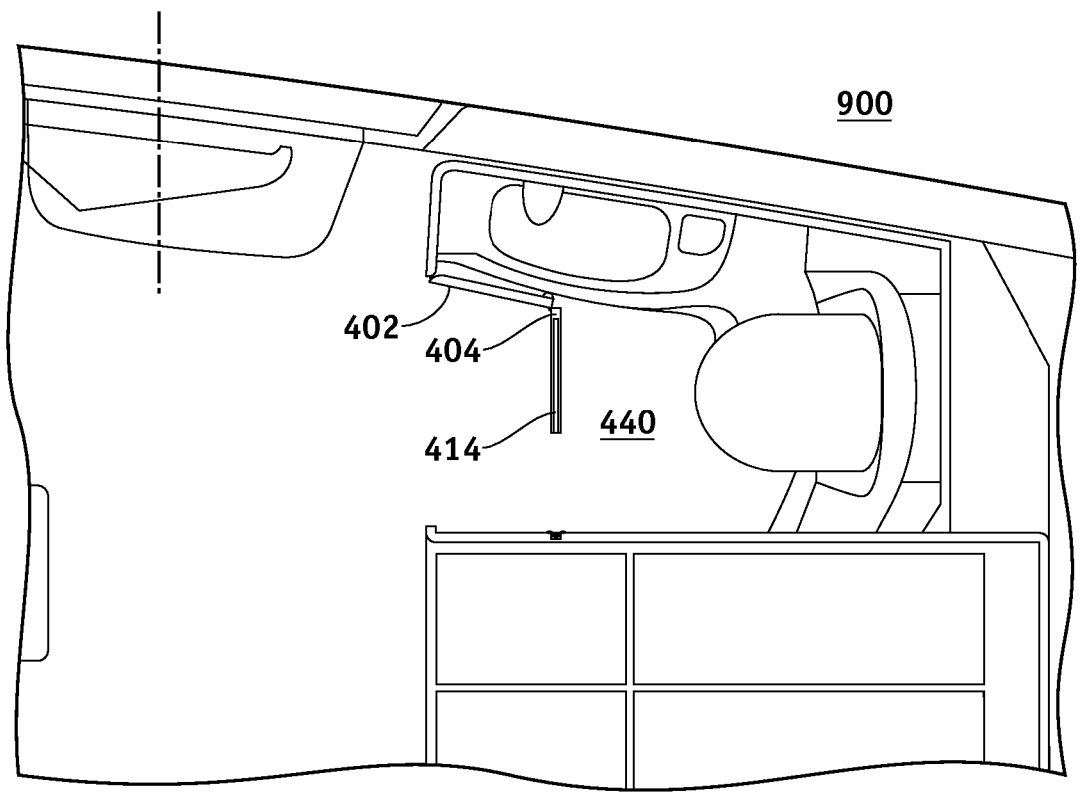
Figure 10:
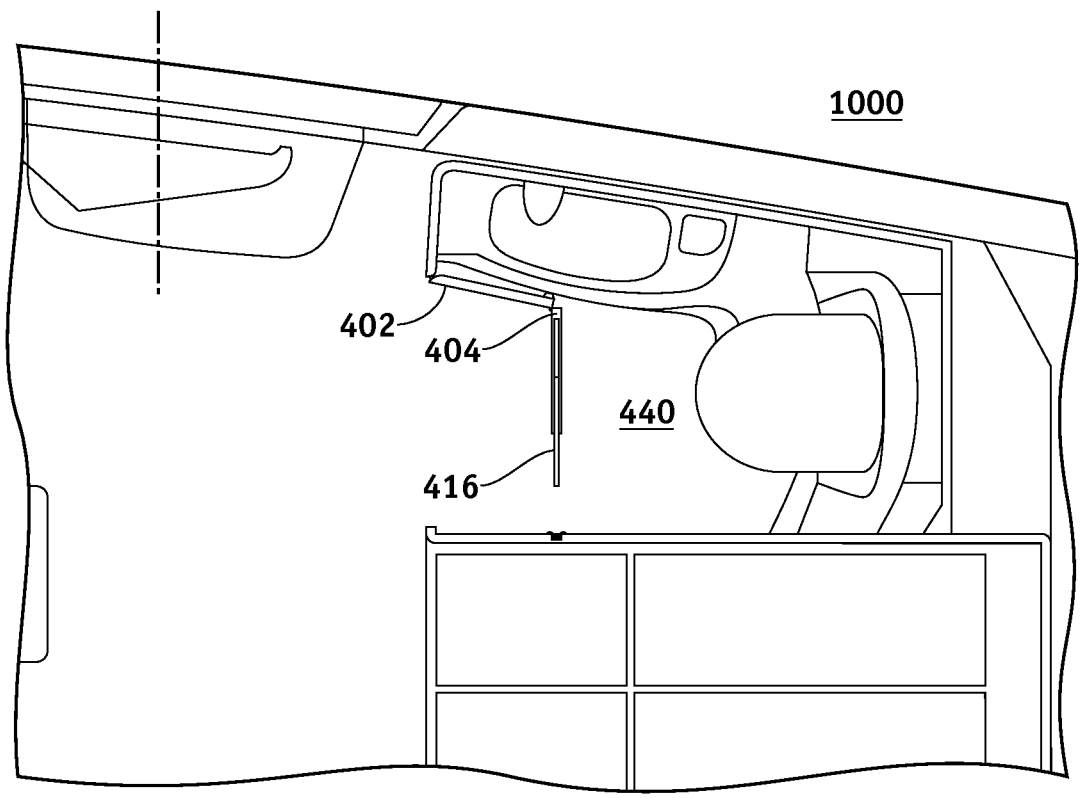

FIG. 5 is an illustration of a dual function lavatory door system 500 (system 500) according to an embodiment of the disclosure. System 500 may have functions, material, and structures that are similar to the embodiments shown in FIG. 4. Therefore, common features, functions, and elements may not be redundantly described here. The system 500 may comprise the dual function lavatory door 302, a manual activation mechanism 508, a controller 510, and actuation motors 512.

The extendable door panel 404 decouples from a slide track 1204 (FIG. 12) in response to an activation mechanism 508/512 such as the manual activation mechanism 508 or an automatic activation mechanism 512 such as the actuation motors 512 as explained in more detail below. The slide track 1204 slides the extendable door panel 404 to couple to a second side 458 (FIG. 4) of the lavatory doorway 456 opposite to the first side 454 (FIG. 4) of the lavatory doorway 456. The hinged door panel 402 comprises the doorway hinge 452 coupled to the first side 454 of the lavatory doorway 456 and is coupled to the first interior side-wall 420 of the aircraft lavatory 306 in response to the activation mechanism 508/512.

The extendable door panel 404 folds along the vertical hinge 418 coupled to the hinged door panel 402, into the interior space 440 of the aircraft lavatory 306 in response to the activation mechanism 508/512.

The extension panel 416 is coupled to the extendable door panel 404 and extends from the extendable door panel 404 to couple to the second interior side-wall 422 of the aircraft lavatory 306 opposite to the first interior side-wall 420 in response to the activation mechanism 508/512.

The manual activation mechanism 508 may comprise a latch (not shown) that can be operated by the crew member 1302 (FIG. 13). The latch may be pulled or pushed to release the dual function lavatory door 302 from moving only along the slide track 1204. Other manual activation mechanisms may also be used. The dual function lavatory door 302 may also be activated automatically by the automatic activation mechanism 512 such as the actuation motors 512.

The controller 510 may comprise, for example but without limitation, a processor module 516, a memory module 514, or other module. The controller 510 may be implemented as, for example but without limitation, a part of an aircraft system, a centralized aircraft processor, a subsystem computing module comprising hardware and/or software devoted to the system 500, or other processor. The controller 510 may communicate with the actuation motors 512 via a communication link 520.

The controller 510 is configured to control the actuation motors 512 to activate the dual function lavatory door 302 according to various emergency conditions. The emergency conditions may comprise, for example but without limitation, flight conditions, ground operations, or other condition. The flight conditions may comprise, for example but without limitation, landing, or other flight condition. The ground operations may comprise, for example but without limitation, air breaking after landing, taxing, parking, or other ground operation. The controller 510 may be located remotely from the actuation motors 512, or may be coupled to the actuation motors 512. In one embodiment, the controller 510 may be placed in a cockpit of the aircraft 200.

The processor module 516 comprises processing logic that is configured to carry out the functions, techniques, and processing tasks associated with the operation of the system 500. In particular, the processing logic is configured to support the system 500 described herein. For example, the processor module 516 may direct the actuation motors 512 to decouple the dual function lavatory door 302 from the slide track 1204.

The processor module 516 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices comprising hardware and/or software, e.g., a combination of a digital signal processor and a microprocessor, a plurality of microprocessors, one or more microprocessors in conjunction with a digital signal processor core, or any other such configuration.

The memory module 514 may comprise a data storage area with memory formatted to support the operation of the system 500. The memory module 514 is configured to store, maintain, and provide data as needed to support the functionality of the system 500. For example, the memory module 526 may store flight configuration data, actuation signal(s) for activation of the actuation motors 512, or other data.

In some embodiments, the memory module 514 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 514 may be coupled to the processor module 516 and configured to store, for example but without limitation, a database, and the like. Additionally, the memory module 514 may represent a dynamically updating database containing a table for updating the database, or other application. The memory module 514 may also store, a computer program that is executed by the processor module 516, an operating system, an application program, tentative data used in executing a program, or other application.

The memory module 514 may be coupled to the processor module 516 such that the processor module 516 can read information from and write information to the memory module 514. For example, the processor module 516 may access the memory module 514 to access an emergency status, an activation command, or other data.

As an example, the processor module 516 and memory module 514 may reside in respective application specific integrated circuits (ASICs). The memory module 514 may also be integrated into the processor module 516. In an embodiment, the memory module 514 may comprise a cache memory for storing temporary variables or other intermediate information during execution of instructions to be executed by the processor module 516.

FIGS. 6-11 are illustrations of top views of an exemplary dual function lavatory door 302 showing a deployment sequence of the dual function lavatory door 302 starting from a normal cruise position 600, changing to intermediate positions 700, 800, 900, 1000 and ending in an emergency egress position 1100 (deployed position 1100) according to an embodiment of the disclosure. In this document, emergency egress position 1100 and deployed position 1100 may be used interchangeably.

FIG. 12 is an illustration of an exemplary front view 1200 of the dual function lavatory door 302 in the normal cruise position 600 and in the emergency egress position 1100 according to an embodiment of the disclosure. The dual function lavatory door 302 comprises the hinged door panel 402, the extendable door panel 404, and the extension panel 416. Instructional information 1202 for reading by passengers and crew members may be located on the extension panel 416 of the extendable door panel 404 when the dual function lavatory door 302 is in the deployed position 1100.

FIG. 13 is an illustration of an exemplary front view 1300 of the dual function lavatory door 302 in the normal cruise position 600 and in the emergency egress position 1100 according to an embodiment of the disclosure showing a crew member 1302 standing on a floor of the aircraft cabin near the dual function lavatory door 302 in a normal cruise position 600.

Figure 14:
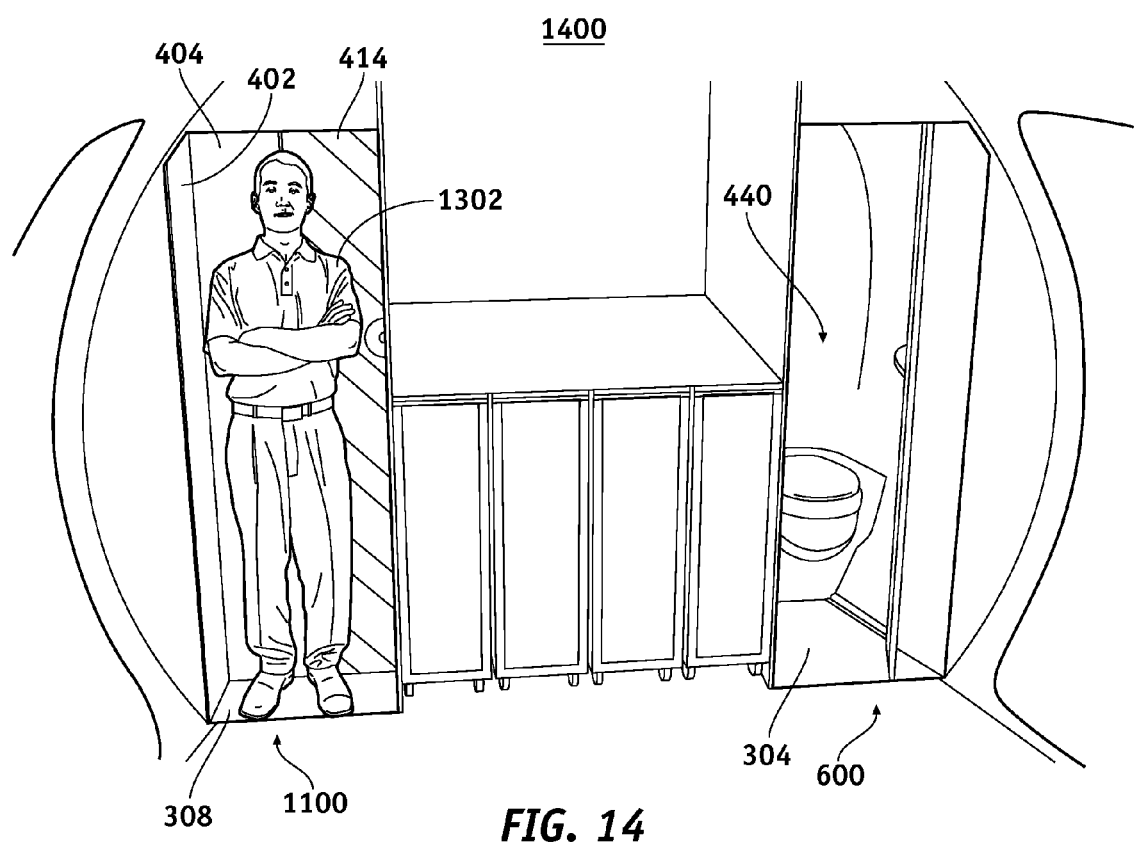
FIG. 14 is an illustration of an exemplary front view of a dual function lavatory door in a normal cruise position and in an emergency egress position showing a crew member standing on a secondary space provided by the dual function lavatory door in the emergency egress position according to an embodiment of the disclosure.

FIG. 14 is an illustration of an exemplary front view of the dual function lavatory door 302 in the emergency egress position 1100 showing a crew member 1302 standing on the secondary space 308 provided by deploying the dual function lavatory door 302 in the emergency egress position 1100 according to an embodiment of the disclosure. The secondary space 308 is defined by the hinged door panel 402, the extendable door panel 404 and the extension panel 416 on the floor 304 of the lavatory.

Figure 15:
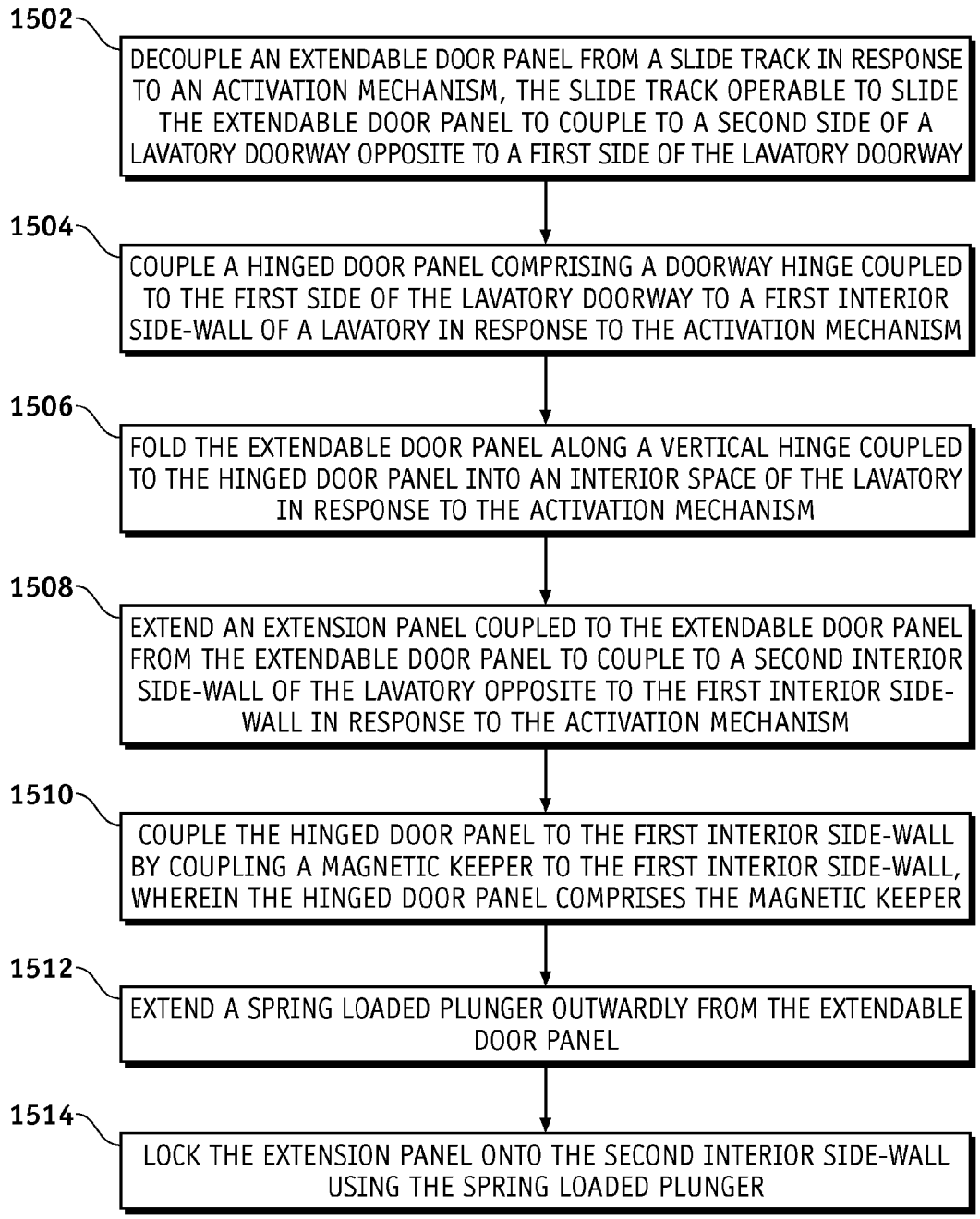
FIG. 15 is an illustration of an exemplary flowchart showing a process for deploying a dual function lavatory door according to an embodiment of the disclosure.

FIG. 15 is an illustration of an exemplary flowchart showing a process 1500 for deploying the dual function lavatory door 302 according to an embodiment of the disclosure. The various tasks performed in connection with process 1500 may be performed mechanically, by software, hardware, firmware, computer-readable software, computer readable storage medium, or any combination thereof. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

For illustrative purposes, the following description of process 1500 may refer to elements mentioned above in connection with FIGS. 1-14. In some embodiments, portions of the process 1500 may be performed by different elements of the dual function lavatory door 302 and the system 500 such as: The hinged door panel 402, the extendable door panel 404, the extension panel 416 the secondary space 308, etc. It should be appreciated that process 1500 may include any number of additional or alternative tasks, the tasks shown in FIG. 15 need not be performed in the illustrated order, and the process 1500 may be incorporated into a more comprehensive procedure or process having additional functionality not described in detail herein.

Process 1500 may begin by decoupling an extendable door panel an such as the extendable door panel 404 from a slide track such as the slide track 1204 in response to an activation mechanism such as the manual activation mechanism 508 or the automatic activation mechanism 512 such as the actuation motors 512, the slide track 1204 operable to slide the extendable door panel 404 to couple to a second side such as the second side 458 of a lavatory doorway such as the lavatory doorway 456 opposite to a first side such as the first side 454 of the lavatory doorway 456 (task 1502).

Process 1500 may continue by coupling a hinged door panel, such as the hinged door panel 402 comprising a doorway hinge such as the doorway hinge 452 coupled to the first side 454 of the lavatory doorway 456, to a first interior side-wall such as the first interior side-wall 420 of a lavatory such as the aircraft lavatory 306 in response to the activation mechanism 508/512 (task 1504).

Process 1500 may continue by folding the extendable door panel 404 along a vertical hinge such as the vertical hinge 418 coupled to the hinged door panel 402 into an interior space such as the interior space 440 of the lavatory in response to the activation mechanism 508/512 (task 1506).

Process 1500 may continue by extending an extension panel such as the extension panel 416 coupled to the extendable door panel 404 from the extendable door panel 404 to couple to a second interior side-wall such as the second interior side-wall 422 of the lavatory opposite to the first interior side-wall 420 in response to the activation mechanism 508/512 (task 1508).

Process 1500 may continue by coupling the hinged door panel 402 to the first interior side-wall 420 by coupling a magnetic keeper such as the magnetic keeper 502 to the first interior side-wall 420, wherein the hinged door panel 402 comprises the magnetic keeper 502 (task 1510).

Process 1500 may continue by extending a spring loaded plunger such as the spring loaded plunger 460 outwardly from the extendable door panel 404 (task 1512).

Process 1500 may continue by locking the extendable door panel 404 onto the second interior side-wall 422 using the spring loaded plunger 460 (task 1514).

Figure 16:
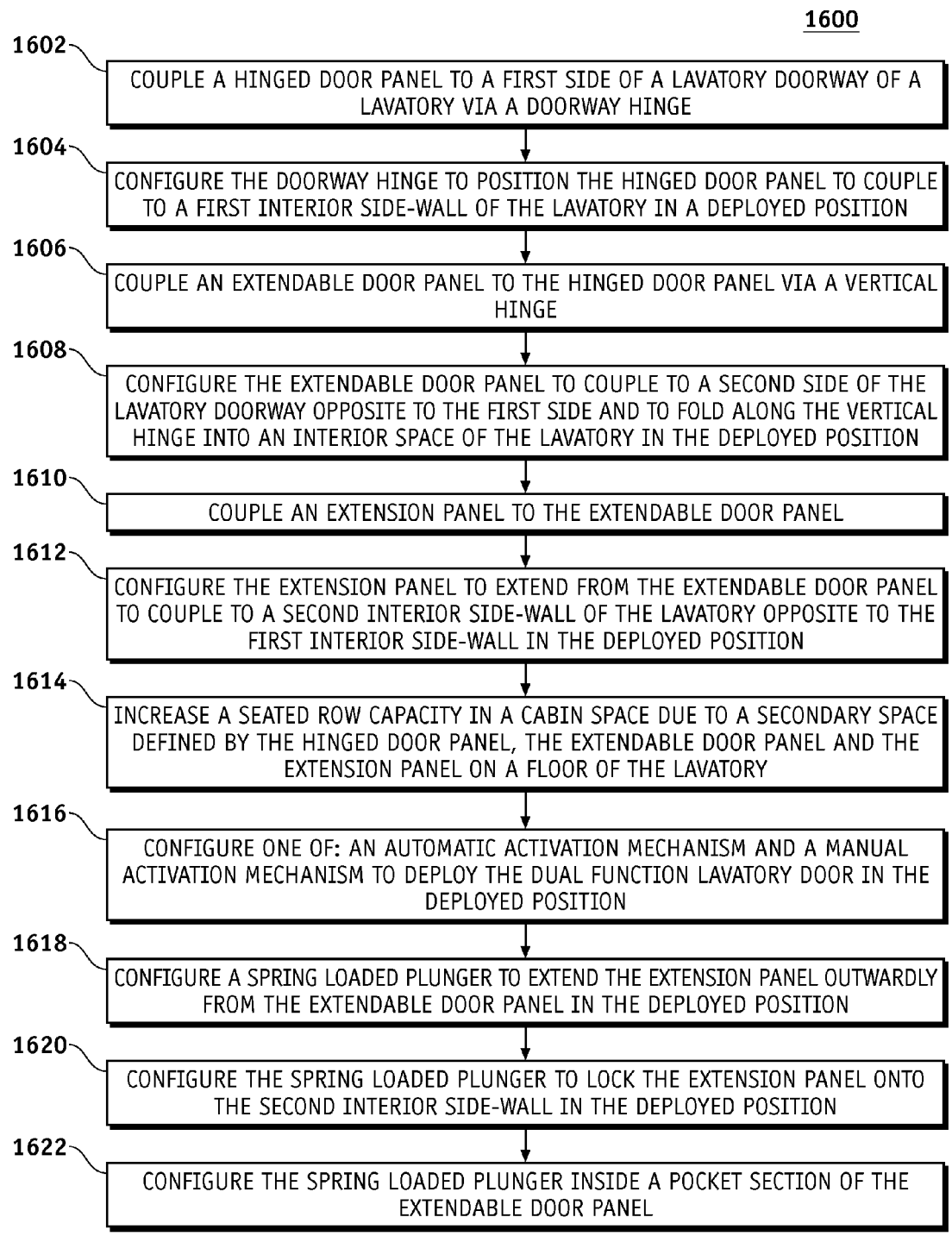
FIG. 16 is an illustration of an exemplary flowchart showing a process for configuring a dual function lavatory door according to an embodiment of the disclosure.

FIG. 16 is an illustration of an exemplary flowchart showing a process 1600 for configuring the dual function lavatory door 302 according to an embodiment of the disclosure. The various tasks performed in connection with process 1600 may be performed mechanically, by software, hardware, firmware, computer-readable software, computer readable storage medium, or any combination thereof. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

For illustrative purposes, the following description of process 1600 may refer to elements mentioned above in connection with FIGS. 1-14. In some embodiments, portions of the process 1600 may be performed by different elements of the dual function lavatory door 302 and the system 500 such as: The hinged door panel 402, the extendable door panel 404, the extension panel 416 the secondary space 308, etc. It should be appreciated that process 1600 may include any number of additional or alternative tasks, the tasks shown in FIG. 16 need not be performed in the illustrated order, and the process 1600 may be incorporated into a more comprehensive procedure or process having additional functionality not described in detail herein.

Process 1600 may begin by coupling a hinged door panel such as the hinged door panel 402 to a first side such as the first side 454 of a lavatory doorway such as the lavatory doorway 456 of a lavatory such as the aircraft lavatory 306 via a doorway hinge such as the doorway hinge 452 (task 1602).

Process 1600 may continue by configuring the doorway hinge 452 to position the hinged door panel 402 to couple to a first interior side-wall such as the first interior side-wall 420 of the lavatory in a deployed position such as the deployed position 1100 (task 1604).

Process 1600 may continue by coupling an extendable door panel such as the extendable door panel 404 to the hinged door panel 402 via a vertical hinge such as the vertical hinge 418 (task 1606).

Process 1600 may continue by configuring the extendable door panel 404 to couple to a second side such as the second side 458 of the lavatory doorway 456 opposite to the first side 454, and to fold along the vertical hinge 418 into an interior space such as the interior space 440 of the aircraft lavatory 306 in the deployed position 1100 (task 1608).

Process 1600 may continue by coupling an extension panel such as the extension panel 416 to the extendable door panel 404 (task 1610).

Process 1600 may continue by configuring the extension panel 416 to extend from the extendable door panel 404 to couple to a second interior side-wall such as the second interior side-wall 422 of the aircraft lavatory 306 opposite to the first interior side-wall 420 in the deployed position 1100 (task 1612).

Process 1600 may continue by increasing a seated row capacity in a cabin space such as the cabin space of the aircraft cabin layout 300 due to a secondary space such as the secondary space 308 defined by the hinged door panel 402, the extendable door panel 404 and the extension panel 416 on a floor such as the floor 304 of the aircraft lavatory 306 (task 1614). For example but without limitation, the aircraft cabin layout 300 allows for addition of substantial number of economy class seats such as 9 seats in rows 318, 320, and 322, or other number of seats suitable for a given cabin space.

Process 1600 may continue by configuring one of: an automatic activation mechanism such as the automatic activation mechanism 512 and a manual activation mechanism such as the manual activation mechanism 508 to deploy a dual function lavatory door such as the dual function lavatory door 302 in the deployed position 1100 (task 1616).

Process 1600 may continue by configuring a spring loaded plunger such as the spring loaded plunger 460 to extend the extension panel 416 outwardly from the extendable door panel 404 in the deployed position 1100 (task 1618).

Process 1600 may continue by configuring the spring loaded plunger 460 to lock the extension panel 416 onto the second interior side-wall 422 in the deployed position 1100 (task 1620).

Process 1600 may continue by configuring the spring loaded plunger 460 inside a pocket section such as the pocket section 414 of the extendable door panel 404 (task 1622).

In this way, embodiments of the disclosure provides an egress assistance space allowing a crew member to stand or be located at the egress assistance space to facilitate passengers exiting through rear cabin aircraft boarding doors located along a centerline of a cross isle. In this manner, the aircraft cabin layout allows for addition of substantial number of economy class seats.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-14 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, storage unit, or other non-transitory media. These and other forms of computer-readable media may be involved in storing one or more instructions for use by the processor module 516 to cause the processor module 516 to perform specified operations. Such instructions, generally referred to as "computer program code" or "program code" (which may be grouped in the form of computer programs or other groupings), when executed, enable the system 500.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A dual function lavatory door comprising:
   a hinged door panel comprising a doorway hinge operable to couple to a first side of a lavatory doorway of a lavatory and to position the hinged door panel to couple to a first interior side-wall of the lavatory in a deployed position;
   an extendable door panel coupled to the hinged door panel by a vertical hinge, and operable to couple to a second side of the lavatory doorway opposite to the first side and to fold along the vertical hinge into an interior space of the lavatory in the deployed position; and
   an extension panel coupled to the extendable door panel and operable to extend from the extendable door panel to couple to a second interior side-wall of the lavatory opposite to the first interior side-wall in the deployed position.

2. The dual function lavatory door of claim 1, further comprising a spring loaded plunger operable to extend outwardly from the extendable door panel to lock the extendable door panel to the second interior side-wall.

3. The dual function lavatory door of claim 2, further comprising a lock receiver located on the second interior side-wall and operable to receive the spring loaded plunger.

4. The dual function lavatory door of claim 2, wherein the spring loaded plunger is located inside a pocket section of the extendable door panel.

5. The dual function lavatory door of claim 1, wherein the hinged door panel, the extendable door panel and the extension panel define a secondary space on a floor of the lavatory.

6. The dual function lavatory door of claim 5, wherein the secondary space facilitates seated row capacity increases in a cabin space.

7. The dual function lavatory door of claim 1, wherein the hinged door panel further comprises a magnetic keeper operable to hold the hinged door panel to the first interior side-wall in the deployed position.

8. The dual function lavatory door of claim 7, wherein the magnetic keeper is operable to magnetically couple to a sink of the first interior side-wall.

9. The dual function lavatory door of claim 1, further comprising instructional information readable on the extendable door panel when the dual function lavatory door is in the deployed position.

10. The dual function lavatory door of claim 1, further comprising an automatic activation mechanism operable to deploy the deployed position.

11. The dual function lavatory door of claim 1, wherein dual function lavatory door comprises at least two folding panels.

12. A method for deploying a dual function lavatory door, the method comprising:
   decoupling an extendable door panel from a slide track in response to an activation mechanism, the slide track operable to slide the extendable door panel to couple to a second side of a lavatory doorway opposite to a first side of the lavatory doorway;
   coupling a hinged door panel comprising a doorway hinge coupled to the first side of the lavatory doorway to a first interior side-wall of a lavatory in response to the activation mechanism;
   folding the extendable door panel along a vertical hinge coupled to the hinged door panel into an interior space of the lavatory in response to the activation mechanism; and
   extending an extension panel coupled to the extendable door panel from the extendable door panel to couple to a second interior side-wall of the lavatory opposite to the first interior side-wall in response to the activation mechanism.

13. The method of claim 12, further comprising coupling the hinged door panel to the first interior side-wall by coupling a magnetic keeper to the first interior side-wall, wherein the hinged door panel comprises the magnetic keeper.

14. The method of claim 12, further comprising:
   extending a spring loaded plunger outwardly from the extendable door panel; and
   locking the extension panel onto the second interior side-wall using the spring loaded plunger.

15. The method of claim 12, wherein the activation mechanism comprises one of: a manual activation mechanism, and an automatic activation mechanism.

16. A method for configuring a dual function lavatory door for an aircraft lavatory, the method comprising:
   coupling a hinged door panel to a first side of a lavatory doorway of a lavatory via a doorway hinge;
   configuring the doorway hinge to position the hinged door panel to couple to a first interior side-wall of the lavatory in a deployed position;
   coupling an extendable door panel to the hinged door panel via a vertical hinge;
   configuring the extendable door panel to couple to a second side of the lavatory doorway opposite to the first side, and to fold along the vertical hinge into an interior space of the lavatory in the deployed position;
   coupling an extension panel to the extendable door panel; and
   configuring the extension panel to extend from the extendable door panel to couple to a second interior side-wall of the lavatory opposite to the first interior side-wall in the deployed position.

17. The method of claim 16, further comprising increasing a seated row capacity in a cabin space due to a secondary space defined by the hinged door panel, the extendable door panel and the extension panel on a floor of the lavatory.

18. The method of claim 16, further comprising configuring one of: an automatic activation mechanism and a manual activation mechanism to deploy the dual function lavatory door in the deployed position.

19. The method of claim 16, further comprising:
configuring a spring loaded plunger to extend the extension panel outwardly from the extendable door panel in the deployed position; and
configuring the spring loaded plunger to lock the extension panel onto the second interior side-wall in the deployed position.

20. The method of claim 19, further comprising configuring the spring loaded plunger inside a pocket section of the extendable door panel.

* * * * *